US006606538B2

(12) United States Patent
Ponsot et al.

(10) Patent No.: US 6,606,538 B2
(45) Date of Patent: Aug. 12, 2003

(54) SECURE METHOD AND SYSTEM OF VIDEO DETECTION FOR AUTOMATICALLY CONTROLLING A MECHANICAL SYSTEM SUCH AS A MOVING STAIRCASE OR A TRAVELATOR

(76) Inventors: Bernard Ponsot, Chemin des Crêtes, 83500 La Seyne sur Mer (FR); Gérard Ghibaudo, 270 rue Capitaine Barissett, 83200 Toulon (FR); Jean Duterrage, 50 Hameau de Faveyrolles, 83190 Ollioules (FR)

( * ) Notice: Subject to any disclaimer, the term of this patent is extended or adjusted under 35 U.S.C. 154(b) by 0 days.

(21) Appl. No.: 10/191,965

(22) Filed: Jul. 9, 2002

(65) Prior Publication Data

US 2003/0007665 A1 Jan. 9, 2003

(30) Foreign Application Priority Data

Jul. 9, 2001 (FR) ............................................ 01 09097

(51) Int. Cl.[7] ............................ B65G 15/00; G06F 7/00
(52) U.S. Cl. ........................................ 700/230; 198/322
(58) Field of Search ................................ 198/321, 322, 198/331; 700/230

(56) References Cited

U.S. PATENT DOCUMENTS 5,958,072 A 9/1999 Jacobs et al.

FOREIGN PATENT DOCUMENTS

| | | | | | |
|---|---|---|---|---|---|
| FR | 2 773 791 | | | 1/1998 | |
| JP | 406206683 | A | * | 7/1994 | |
| JP | 410187230 | A | * | 12/1996 | |
| JP | 10187230 | A | * | 7/1998 | |
| JP | 410236757 | A | * | 9/1998 | |
| JP | 10265163 | A | * | 10/1998 | |
| JP | 10318600 | | | 10/1998 | |
| JP | 411021059 | A | * | 1/1999 | |
| JP | 2000007264 | A | * | 1/2000 | ........... B66B/29/00 |
| JP | 2000034087 | A | * | 2/2000 | ........... B66B/29/04 |
| JP | 2000137790 | A | * | 5/2000 | ........... G06T/01/00 |
| JP | 2000211873 | A | * | 8/2000 | ........... B66B/27/00 |
| JP | 2000255964 | A | * | 9/2000 | |

* cited by examiner

*Primary Examiner*—Christopher P. Ellis
*Assistant Examiner*—Richard Ridley

(57) ABSTRACT

A method for detecting persons or objects in a detection zone covering a mechanical system that is to be controlled as a function of propel or objects being detected at present in the detection zone an initialization phase consisting in checking the hardware and software elements of a monitoring processor coupled to a control device for controlling the mechanical system; a processing loop comprises for active camera connected to the processor and covering the detection zone: acquiring and processing an image supplied by the camera in order to generate detection data and determine which commands to apply to the control device; and checking both the image quality and the position of the camera relative to the detection zone; and a phase in which the control device is controlled using commands determined in the processing loop and as a function of any faults detected while carrying out the checks.

11 Claims, 4 Drawing Sheets

SECURE METHOD AND SYSTEM OF VIDEO DETECTION FOR AUTOMATICALLY CONTROLLING A MECHANICAL SYSTEM SUCH AS A MOVING STAIRCASE OR A TRAVELATOR

FIELD OF THE INVENTION

The present invention relates to a secure method of using video to detect persons or objects, and also to a system enabling the method to be implemented.

The invention applies particularly, but not exclusively, to automatic or semiautomatic control of systems for transporting people, such as moving staircases (escalators) or travelators.

Naturally, the invention can also be applied to conveying goods, to detecting objects or persons in approach zones of or close to transport systems, or indeed in the vicinity of doors giving access to zones that are to be kept secure.

BACKGROUND OF THE INVENTION

At present, whenever it is desired to start or restart a moving staircase or a travelator following a stoppage, whether normal or in an emergency, it is necessary for safety reasons for a person to verify that no person or object is to be found on the staircase or travelator.

In addition, automatic starting following detection of a person approaching the transport system must not be performed until it has been ensured that there is no passenger or object in a predefined safety zone.

Finally, during normal stoppages of the transport system, it is necessary to verify that there is nobody on the system before stopping it.

In French patent application No. 2 773 791, proposals have already been made for a control system including video cameras that provide images of stationary and/or moving portions of the mechanical device that is to be controlled. That system continuously compares the images received from the cameras with reference images taken in the absence of persons on the controlled mechanical device in order to determine whether people are on the mechanical device or in an approach zone thereto, and in order to cause the device to be stopped or started as a function of the presence or absence of people in the received images.

It is found that that system does not provide sufficient safety in operation, and as a result it has not been approved by the official approval bodies concerned. In particular, such a system is not designed to warn of faults in its own operation and it does not make it possible to guarantee that information it provides concerning the presence or the absence of a person or an object on the mechanical system is reliable information.

OBJECTS AND SUMMARY OF THE INVENTION

An object of the present invention is to eliminate that drawback. This object is achieved by providing a method for detecting persons or objects in a detection zone in order to control a mechanical system such as a transport device as a function of presence of objects or persons detected in the detection zone by means of cameras displayed in such a manner as to cover the detection zone and connected to a monitoring processor coupled to a control device for controlling the mechanical system.

According to the invention, the method comprises:

- an initialization phase comprising a step of checking hardware elements of the monitoring processor and data stored in the monitoring processor;
- a processing loop including, for each active camera, a step of acquiring an image supplied by the camera and of processing the image in order to generate detection data whenever a person or an object is detected in the detection zone and in order to determine which commands to apply to the control device of the mechanical system, a step of checking the quality of the image, a step of checking the position of the camera relative to the detection zone, and a step of checking hardware elements of the monitoring processor and data stored in the monitoring processor; and
- a phase of checking and controlling the control device using commands determined in the processing loop and as a function of any defects detected during the checking step.

By means of the set of checks and tests that it performs, the monitoring processor provides the control device of the system to be controlled with information concerning the presence of persons or objects, in which said presence is detected with a very high level of reliability. This ensures that the commands applied to the control device of the system to be controlled are consistent and appropriate.

Advantageously, the checks performed during the processing loop are periodic, each check having an execution period adapted as a function of the critical nature and the probability of failure of the element or the data being checked.

According to a feature of the invention, the step of checking image quality consists in determining the mean luminance of analyzed zones of the image and in comparing the mean luminance with high and low thresholds, image quality being considered as satisfactory if the mean luminance lies between the high and low thresholds.

According to another feature of the invention, the step of checking the position of each camera consists in analyzing specific predefined zones in the images supplied by the camera in order to determine whether said zones present predetermined characteristics, and if these zones do not present said predetermined characteristics, then the camera is considered as being faulty because it has been moved.

Preferably, the method further comprises a step of updating reference images in order to adapt to variations in ambient luminosity in the detection zone.

Also preferably, the method further comprises a step of checking the image processing algorithm, which step consists in running the image processing algorithms on a video test pattern, and in comparing the results obtained with reference values.

Advantageously, data checking relates to parameter data, reference image data, and programs executed by the monitoring processor.

The invention also provides a secure system for detecting persons or objects in a detection zone in order to control a mechanical system such as a transport device, the detection system comprising a set of cameras covering the detection zone and a monitoring processor coupled to the cameras and to a control device for controlling the mechanical system.

According to the invention, the system comprising:

- means responsive to each active camera in succession to acquire and process an image supplied by the camera, and to determine the commands that are to be applied to the control device;
- means for checking the image quality and the position of each camera relative to the detection zone during image acquisition and processing;

means for checking the hardware elements of the processor and the data stored in the processor, during image acquisition and processing and during a stage of initializing the processor; and means for checking and controlling the control device for controlling the mechanical system by means of commands that are generated providing no error is detected by the check means.

According to a feature of the invention, the system further comprises means for determining the ambient luminosity of the detection zone, and for updating reference image data as a function of variation in ambient luminosity.

According to another feature of the invention, the system further comprises means for determining the mean luminance of analyzed zones of the image and for comparing the mean luminance with high and low thresholds, the quality of the image being considered as sufficient if the mean luminance lies between the high and low thresholds.

According to another feature of the invention, the system comprises means for cyclically checking proper operation of memories of the processor.

BRIEF DESCRIPTION OF THE DRAWINGS

A preferred embodiment of the invention is described below by way of non-limiting example and with reference to the accompanying drawings, in which.

DETAILED DESCRIPTION

Figure 1:
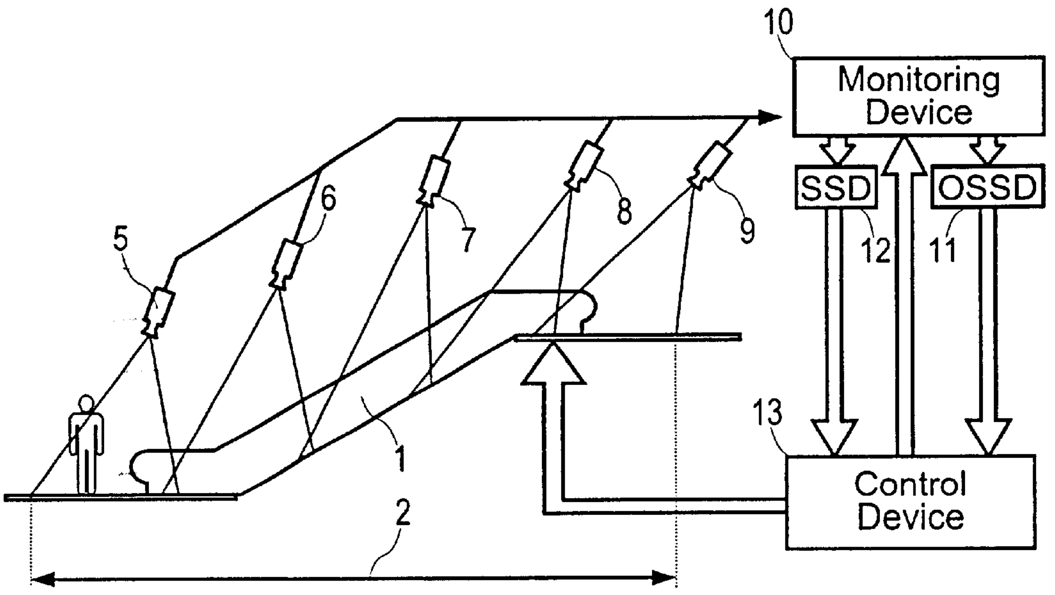
FIG. 1 is a diagram of a moving staircase fitted with a system for detection by cameras in accordance with the invention.

FIG. 1 shows a moving staircase 1 fitted with a video detection system of the invention. The system comprises a set of cameras 5 to 9, with the number and the disposition of the cameras being determined in such a manner that their respective fields of view cover an entire detection zone 2 which includes all of the moving staircase together with the top and bottom approach zones to the staircase 1 over a predetermined length.

The cameras 5 to 9 are connected to a monitoring device 10 to which they transmit video images of the respective zones they cover. The monitoring device is designed to respond to the images transmitted by the cameras 5 to 9 to determine whether an object or a person is to be found in the detection zone 2.

The monitoring device is connected to a control device 13 for controlling the staircase 1 via two switch devices 11, 12, namely a first device 11 for switching the presence-detection signal of the monitoring device 10, and a second device 12 for switching the unavailability or failure signal of the monitoring device.

Figure 2:
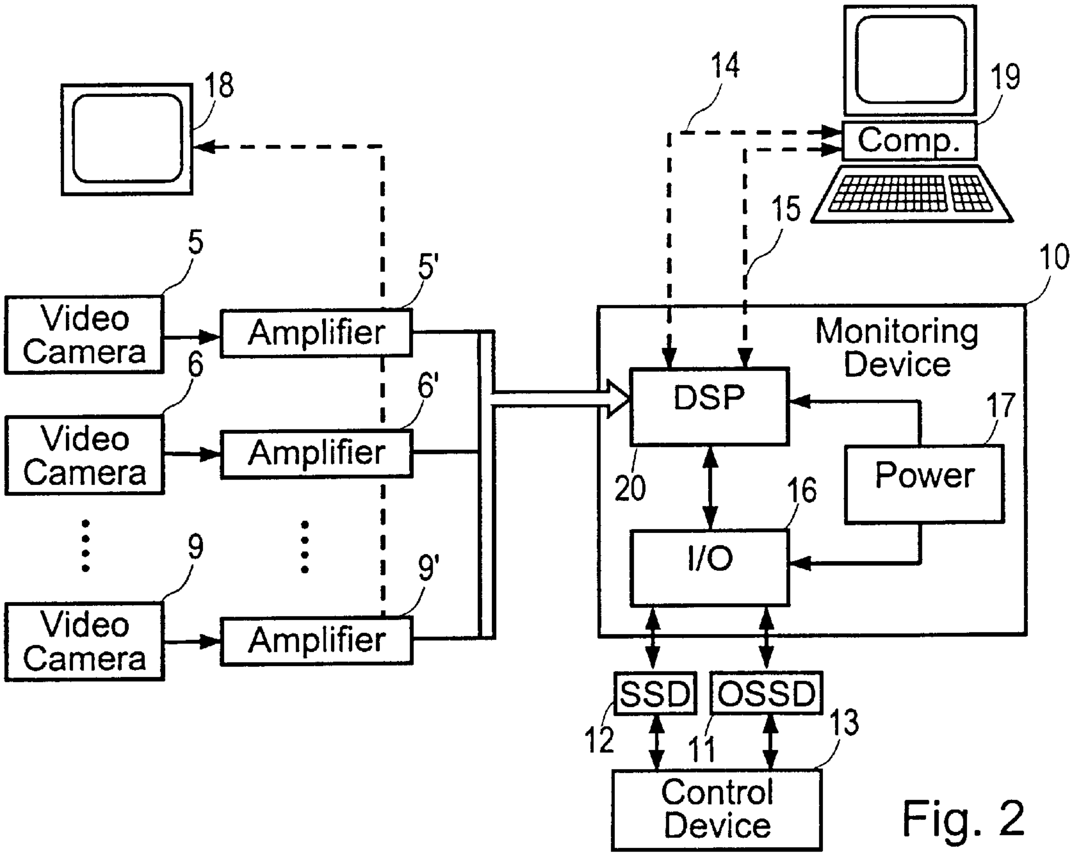
FIG. 2 is a block diagram showing the various elements making up the detection system shown in FIG. 1.

FIG. 2 shows the detection system of the invention in greater detail, with the video cameras 5 to 9 optionally connected to the monitoring device 10 via respective amplifiers 5' to 9', each amplifier having an additional video output for connection to one or more remote monitoring devices 18.

The monitoring device 10 comprises a processor 20 connected firstly to the cameras 5 to 9 (optionally via the video amplifiers 5' to 9') and secondly to an input/output circuit 16 which is connected to the control device 13 for the staircase 1, with the processor 20 and the circuit 16 being powered by a power supply circuit 17.

The input/output circuit 16 serves to shape and transmit signals between the processor and the control device 13.

The main function of the processor 20 is to receive the images coming from the cameras, to process the images in order to determine whether or not persons or objects are present in the detection zone 2, and as a function of the presence or absence of persons or objects in the detection zone to generate command signals for controlling the staircase 1, which signals are to be applied to the control device 13.

The processor 20 has a series connection 14 and a parallel video connection 15 for connection to a microcomputer 19 for parameterizing and maintaining the system.

Figure 3:
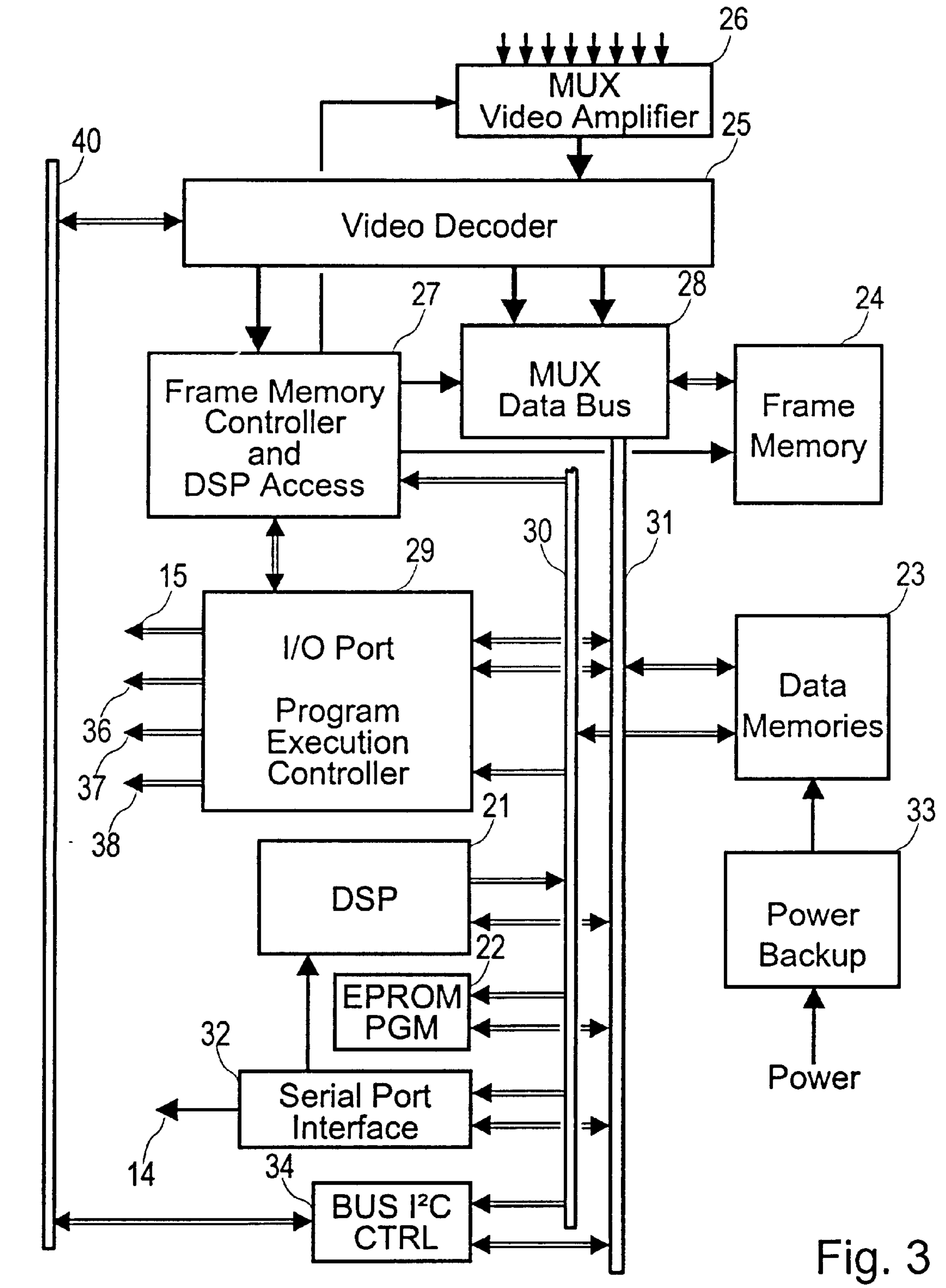
FIG. 3 is a block diagram in greater detail showing the processor of the detection system shown in FIG. 2.

FIG. 3 shows the internal architecture of the processor 20, the processor comprises a microprocessor 21 for example of the digital signal processor (DSP) type connected via an address bus 30 and a data bus 31 to memories 22 and 23, specifically a non-volatile program memory 22, e.g. of the EPROM type, and one or more data memories 23 which may optionally be volatile. The data memories preferably include at least one non-volatile memory, e.g. of the Flash type for permanently storing the configuration parameters of the system.

The processor 20 also comprises the following which are connected to the address bus 30 and to the data bus 31:

a serial port interface circuit 32 providing the connection 14 with the microcomputer 19;

an interface circuit for the input/output ports 29 providing in particular the video output 15, and the interface with the switching devices 11 and 12;

circuits 24 to 28 for managing and preprocessing the video signals transmitted by the cameras 5 to 9; and a circuit 33 connected in particular to the data memories 23, and serving to generate a backup power supply for them, together with a watchdog function for triggering initialization of the processor 20 in the event of a breakdown.

In particular, the interface circuit for the input/output ports 29 has a command port and a port for reading the positions of the switch devices 11 and 12. It also serves to perform the function of checking proper operation of the program executed by the DSP 21.

The video data management circuits 24 to 28 comprise:

a video multiplexer circuit 26 having a video amplifier and a plurality of video inputs connected to the cameras 5 to 9 respectively;

a video decoder 25 connected to the output of the circuit 26 to control said output and to digitize the video images received from the cameras;

one or more frame memories 24 for storing the digitized images transmitted by the decoder 25;

a frame memory controller 27 connected to the frame memory address port 24; and a data bus multiplexer 28 controlled by the controller 27 and connected to the frame memory data port 24 and to the data bus 31.

The number of inputs to the multiplexer circuit 26 is determined as a function of the maximum number of cameras necessary for covering a detection zone.

The input video signal for processing by the processor 20 at a given instant is selected by the controller 27 which sends an appropriate control signal to the multiplexer circuit 26. The controller 27 also performs a synchronization function by sending a synchronization signal to the DSP 21 each time a new complete image is introduced into the frame memory 24. It also performs a function of multiplexing the address port of the frame memory 24 between the video decoder and the address bus 30.

In conventional manner, the video decoder 25 performs functions of amplification with automatic gain control, of filtering, of extracting synchronization signals, and of sampling so as to obtain pixel values constituted by luminance information and by chrominance information, which values are applied as inputs to the multiplexer 28 for storing in the frame memory 24.

The multiplexer 28 multiplexes the data port of the frame memory between the pixel data of the images supplied by the video decoder 25 and the data bus 31.

The processor 20 further comprises an additional bus 40, e.g. of the $I^2C$ type connected to the address bus 30 and to the data bus 31 via a bus controller 34, the bus 40 enabling the DSP 21 to control the video decoder 25, in particular when the processor starts up, in particular in order to specify a type of video coding to be used and the horizontal and vertical sampling frequencies of the video images.

Figure 4:
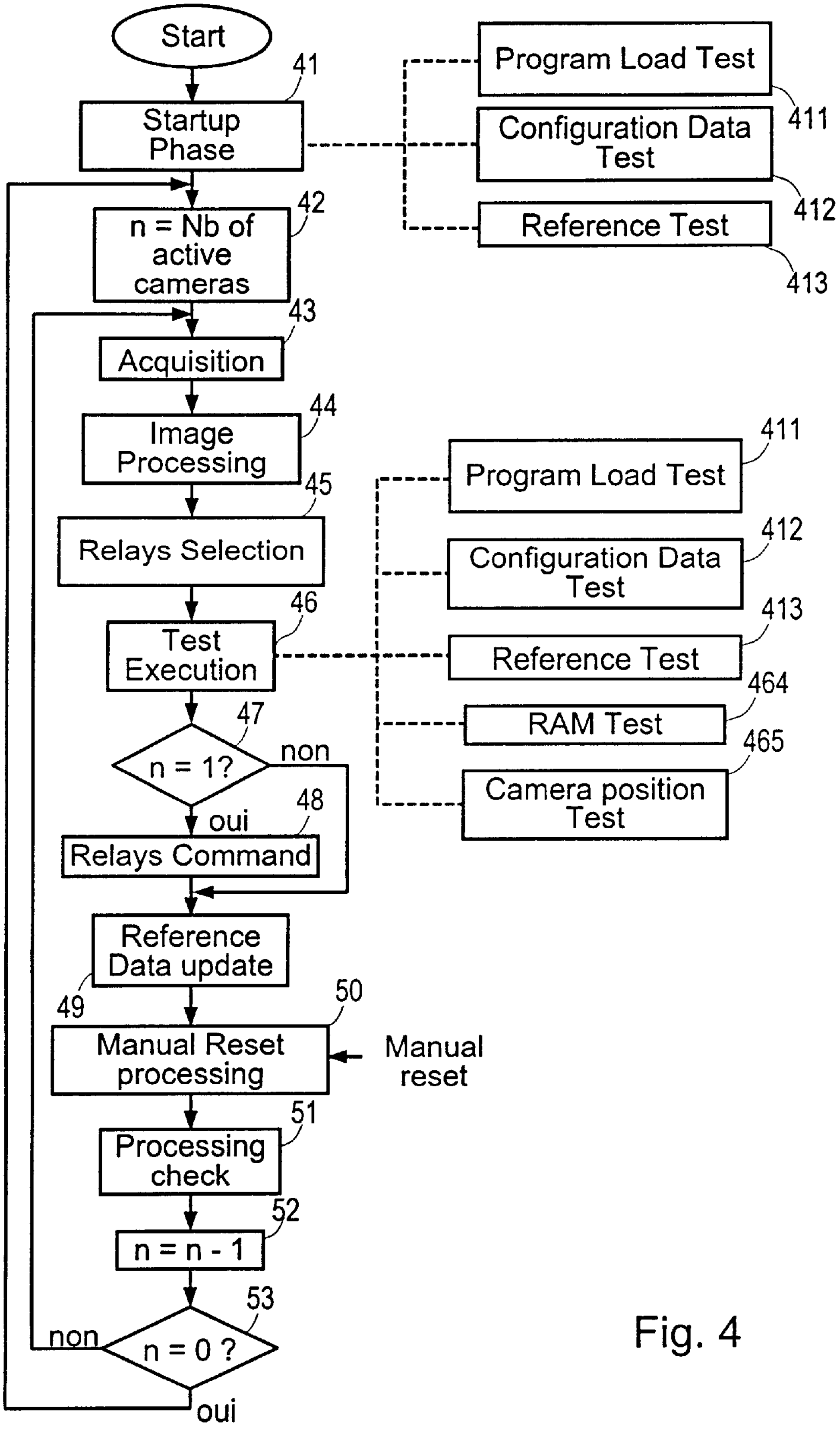
FIG. 4 is a flow chart showing the various steps of the method of the invention implemented by the detection system shown in FIGS. 1 and 2.

FIG. 4 shows the method of the invention as executed by the DSP 21. This method comprises firstly, on initialization of the processor 20, a startup stage 41 including a system test sequence. This test sequence comprises:

- a test 411 of the program loaded for execution in the internal read/write memory of the DSP;
- a system configuration data test 412 which consists in verifying the configuration data contained in the memory 23; and
- a reference test 413 for checking the reference data contained in the memory 23.

These tests consist in calculating a signature relating to the content of the memory being verified and in comparing the calculated signature with a reference signature stored in a predefined memory.

In step 42, the DSP reads the number of cameras 5 to 9 that are active from the configuration data memory 23 in order to load a loop index n, and then controls the multiplexer 26 to select the video channel that corresponds to camera n. In following step 43, it waits for the controller 27 to send it a signal indicating that an image has arrived in the frame memory 24. The arrival of such a signal triggers processing 44 of the new image and acquisition in the frame memory of the image transmitted by the following camera n−1. Image processing is based on analyzing determined histograms over predefined analysis windows. Persons or objects are detected by comparing histograms obtained using the received image with reference histograms obtained using the same analysis windows as applied to a reference image taken in the absence of any person or objects. This processing also determines whether the image is of sufficiently good quality to provide a reliable detection result.

In following step 45, the DSP 21 reads the state of the switch devices 11 and 12, e.g. constituted by relays, and generates a command for application to said relays as a function of their states, as a function of the result of the image processing, and as a function of the results of tests performed previously.

Before applying the command as determined in this way to the relays, the processor 21 executes a sequence of tests 46 comprising the tests for checking 411 the loaded program, for checking 412 the configuration data, and for checking 413 the reference data, and also tests for checking 464 the memories 23 and 24 and the internal read/write memory of the DSP 21, and tests for checking 465 the positions of the cameras 5 to 9.

The test for checking the internal memory of the DSP consists in selecting a first cell in a memory range under test and in calculating a signature over all of the other cells in the range in question. The value of the selected cell is then inverted and the signature of all of the other cells in the range in question is calculated again. The value of the selected cell is restored to its initial value and a third signature is calculated over the remaining cells of the range. This procedure is applied to all of the cells in the range under consideration. If a difference is observed in the signatures calculated over the same memory ranges, then a failure message is produced.

An analogous test is applied to the data memory 23.

The test for checking the frame memory 24 consists initially in initializing a memory range of the memory 24 with a uniform binary string, for example of value 0x5555 (in hexadecimal). The value of the first cell is inverted (so as to take the value 0xAAAA in this example) and the other cells of the memory zone range are checked to verify that their content is not modified by modifying the first range. Thereafter, the value of the first cell is again inverted to restore its initial value, and then the procedure is repeated for each of the cells in the range in question. If a difference is observed, a failure message is produced.

The position of each camera is tested by analyzing specific predefined zones in the images supplied by the camera in order to determine whether these zones present predetermined characteristics, and if these zones do not present said predetermined characteristics, then the camera is considered as being faulty because it has been moved. This test is based on defining a plurality of check windows in the images supplied by the camera. These check windows make it possible to define the position of the camera relative to the moving staircase 1. They contain fixed images of specific objects taken as references, of the staircase, or of its environment.

If this analysis reveals meaningful presence of reference objects, for example in at least two windows, then the position of the camera is assumed to be correct. In contrast, if the camera had been moved or its orientation modified, then the check windows would no longer be centered on the reference objects. Consequently, the test would be negative and the camera considered as being faulty.

At the end of each of these checks, if a fault is found, it is stored in a fault log and the command for application to the failure relay 12 is updated in order to indicate that there is a fault in the monitoring device 10. The fault log can subsequently be consulted by means of the parameterizing and maintenance microcomputer 19.

If the number n of the current camera (step 47) corresponds to that of the last camera, then the commands for the relays 11, 12 as determined in step 45 while processing the image from each of the cameras and following the preceding tests are actually applied (step 48) to the relays via the input/output port circuit 29. Thereafter, by reading the states of the relays, it is verified that the relay command has been executed.

Thereafter, and under all circumstances, the DSP 21 performs resetting processing (step 49) which consists in updating the reference data (histograms) obtained from new reference images, in order to take account specifically of any change in ambient lighting.

In step 50, the DSP reads the input/output port 29 to see whether a manual resetting command has been applied, and if so, it stores said request in order to process it during the resetting step 49 executed subsequently.

In step 51, the processor executes a check of the image processing algorithm. This operation is performed on a virtual configuration for a camera number 0. It consists in running the image processing algorithms on a video test pattern stored in the memory 22 and in comparing the results obtained with reference values.

The number n of the camera is decremented in step 52, and if this number is not 0 (step 53), the method returns to step 43 of processing the image coming from camera number n. Otherwise, the method returns to step 42 where n is reinitialized to the total number of cameras 5 to 9.

In parallel with the processing shown in FIG. 4, time and logic monitoring of the way the program is running is performed using an instruction to write a sequential code in a register provided in the circuit 29, said instruction being included in each of the main processes executed by the DSP 21. In the event of the content of this register not being modified during a certain length of time as defined by a timer, e.g. 120 milliseconds (ms), the circuit 29 deactivates the availability relay 12.

Figure 5:
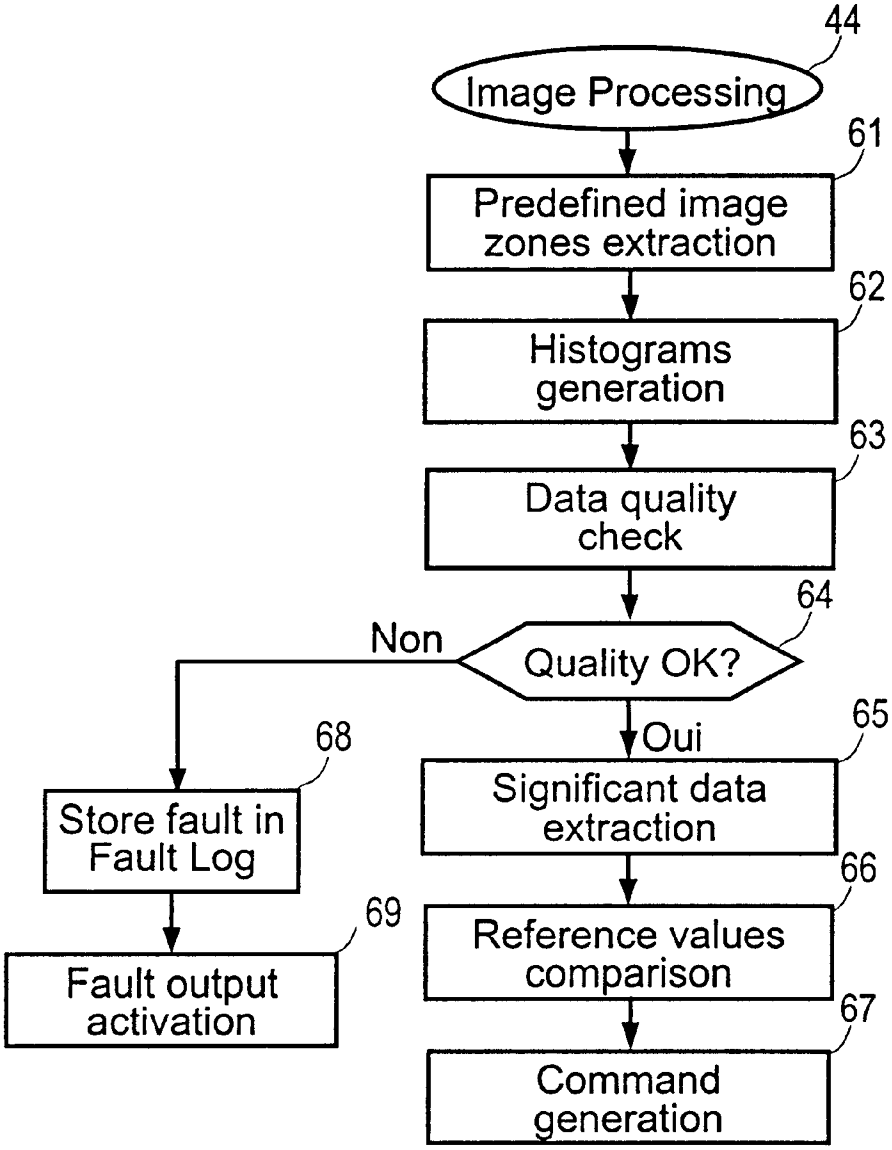
FIG. 5 shows in greater detail the steps of a process mentioned in FIG. 4.

The image processing 44 which is shown in detail in FIG. 5 consists in extracting 61 from the image stored in the frame memory 24 certain predefined zones (windows) of the image, in generating histograms from the pixels in these zones, in verifying 63 the quality of the image, and if said quality is satisfactory (step 64), in evaluating 65 detection data from the histograms, in comparing the detection data with values obtained from reference images taken in the absence of persons or objects, and in generating 67 a command decision as a function of the result of the comparison, indicating whether or not a person or an object is present in the image. If the quality of the image is not sufficient, then this fault is stored (68) in the fault log and the command for applying to the fault relay 12 is updated (69) to inform the control device 13 for the staircase 1 of this fault.

Verifying image quality consists in verifying whether the image is neither too black nor too white by determining the mean luminance of the analyzed zones of the image and comparing said mean luminance with high and low thresholds, the image being considered to be of satisfactory quality if the mean luminance lies between the high and low thresholds. The spread of the histograms is also verified.

All of the above-described checks are performed on each passage through the processing loop, or at some predetermined periodicity which may be different from the time required for processing the loop.

In general, the monitoring device 10 executes periodic check functions so as to verify that all of the elements making it up are functioning properly. The execution of these functions is spread out over time so as to avoid harming the response time of the system for controlling the staircase 1. The execution period for each check is adapted as a function of the critical nature of the element being checked and as a function of the probability of that element failing.

Following a failure, the presence-detection relay 11 and the relay 12 for indicating unavailability of the monitoring device 10 are put into the inactive state.

What is claimed is:

1. A method for detecting persons or objects in a detection zone in order to control a mechanical system as a function of a presence of objects or persons detected in the detection zone by means of cameras disposed so as to cover the detection zone and connected to a monitoring processor coupled to a control device for controlling the mechanical system, the detection method comprising:

an initialization phase comprising a step of checking hardware elements of the monitoring processor and data stored in the monitoring processor;

a processing loop including, for each active camera, a step of acquiring an image supplied by the camera and of processing the image in order to generate detection data whenever a person or an object is detected in the detection zone and in order to determine which commands to apply to the control device of the mechanical system, a step of checking the quality of the image, a step of checking an angular position of the camera relative to the detection zone, and a step of checking hardware elements of the monitoring processor and data stored in the monitoring processor; and a phase of checking and controlling the control device using commands determined in the processing loop and as a function of any defects detected during the checking step.

2. The method according to claim 1, wherein the checks performed during the processing loop are periodic, each check having an execution period adapted as a function of the critical nature and the probability of failure of the element or the data being checked.

3. The method according to claim 1, wherein the step of checking image quality consists in determining the mean luminance of analyzed zones of the image and in comparing the mean luminance with high and low thresholds, image quality being considered as satisfactory if the mean luminance lies between the high and low thresholds.

4. The method according to claim 1, wherein the step of checking the position of each camera consists in analyzing specific predefined zones in the images supplied by the camera in order to determine whether said zones present predetermined characteristics, and if these zones do not present said predetermined characteristics, then the camera is considered as being faulty because it has been moved.

5. The method according to claim 1, further comprising a step of updating reference images in order to adapt to variations in ambient luminosity in the detection zone.

6. The method according to claim 1, further comprising a step of checking the image processing algorithm, which step consists in running the image processing algorithms on a video test pattern, and in comparing the results obtained with reference values.

7. The method according to claim 1, wherein data checking relates to parameter data, reference image data, and programs executed by the monitoring processor.

8. A secure system for detecting persons or objects in a detection zone in order to control a mechanical system, the detection system comprising a set of cameras covering the detection zone and a monitoring processor coupled to the cameras and to a control device for controlling the mechanical system, wherein the processor comprises:

means responsive to each active camera in succession to acquire and process an image supplied by the camera, and to determine the commands that are to be applied to the control device;

means for checking the image quality and the position of each camera relative to the detection zone during image acquisition and processing;

means for checking the hardware elements of the processor and the data stored in the processor, during image acquisition and processing and during a stage of initializing the processor; and means for checking and controlling the control device for controlling the mechanical system by means of commands that are generated providing no error is detected by the check means.

9. The system according to claim 8, further comprising means for determining the ambient luminosity of the detection zone, and for updating reference image data as a function of variation in ambient luminosity.

10. The system according to claim 8, further comprising means for determining the mean luminance of analyzed zones of the image and for comparing the mean luminance with high and low thresholds, the quality of the image being considered as sufficient if the mean luminance lies between the high and low thresholds.

11. The system according to claim 8, comprising means for cyclically checking proper operation of memories of the processor.

* * * * *